US011643592B1

(12) United States Patent
Saini et al.

(10) Patent No.: US 11,643,592 B1
(45) Date of Patent: May 9, 2023

(54) SLOW SETTLING MICRO-PROPPANTS FOR FAR FIELD STIMULATION

(71) Applicant: Saudi Arabian Oil Company, Dhahran (SA)

(72) Inventors: Rajesh Kumar Saini, Cypress, TX (US); Mohammad H. Haque, Katy, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/553,892

(22) Filed: Dec. 17, 2021

(51) Int. Cl.
*C09K 8/80* (2006.01)
*C09K 8/94* (2006.01)

(52) U.S. Cl.
CPC .......... *C09K 8/805* (2013.01); *C09K 8/94* (2013.01)

(58) Field of Classification Search
CPC .................................................. E21B 43/26
See application file for complete search history.

(56) References Cited

U.S. PATENT DOCUMENTS

| | | | |
|---|---|---|---|
| 7,723,275 B2 | 5/2010 | Zhang | |
| 8,985,213 B2 | 3/2015 | Saini et al. | |
| 9,328,285 B2 | 5/2016 | Ekstrand et al. | |
| 9,688,905 B2 | 6/2017 | Nguyen et al. | |
| 9,862,881 B2 | 1/2018 | Drake et al. | |
| 9,896,619 B2 | 2/2018 | Nguyen et al. | |
| 9,938,810 B2 | 4/2018 | Nguyen et al. | |
| 9,995,125 B2 | 6/2018 | Madasu et al. | |
| 10,023,789 B2 | 7/2018 | Tang et al. | |
| 10,060,244 B2 | 8/2018 | Nguyen et al. | |
| 10,106,728 B2 | 10/2018 | Dusterhoft et al. | |
| 10,138,415 B2 | 11/2018 | Bryant et al. | |
| 10,214,682 B2 | 2/2019 | Nguyen et al. | |
| 10,287,867 B2 | 5/2019 | Nguyen et al. | |
| 10,301,917 B2 | 5/2019 | Nguyen et al. | |
| 10,308,868 B2 | 6/2019 | Nguyen et al. | |
| 10,309,208 B2 | 6/2019 | Nguyen et al. | |
| 10,364,660 B2 | 7/2019 | Nguyen et al. | |
| 10,378,345 B2 | 8/2019 | Hall et al. | |
| 2012/0111563 A1* | 5/2012 | Abad | C09K 8/03 166/308.1 |
| 2014/0367100 A1 | 12/2014 | Oliveira et al. | |
| 2017/0152432 A1 | 6/2017 | Vo et al. | |
| 2017/0158952 A1* | 6/2017 | Nguyen | C09K 8/80 |
| 2020/0056090 A1* | 2/2020 | Nguyen | C09K 8/88 |

OTHER PUBLICATIONS

Calvin et al. "Enhancement of Well Production in the SCOOP Woodford Shale through the Application of Microproppant" SPE-184863-MS, 2017, 18 pgs.
Dahl et al. "Application of Micro-Proppant to Enhance Well Production in Unconventional Reservoirs: Laboratory and Field Results" SPE-174060-MS, 2015, 24 pgs.
Sharma et al. "The Role of Induced Un-propped (IU) Fractures in Unconventional Oil and Gas Wells" SPE-174946-MS, 2015, 14 pgs.
Wu et al. "An Experimental Investigation of the Conductivity of Unpropped Fractures in Shales" SPE-184858-MS, 2017, 20 pgs.
U.S. Office Action dated Dec. 2, 2022 pertaining to U.S. Appl. No. 17/553,891, filed Dec. 17, 2021, 18 pages.

* cited by examiner

*Primary Examiner* — William D Hutton, Jr.
*Assistant Examiner* — Avi T Skaist
(74) *Attorney, Agent, or Firm* — Dinsmore & Shohl LLP

(57) ABSTRACT

A method of stimulating petroleum production includes introducing a fracturing fluid into a petroleum formation, thereby creating at least one fracture to stimulate the petroleum production. The fracturing fluid is introduced into the petroleum formation at a pressure above the breakdown pressure of the formation. The fracturing fluid includes a plurality of proppants each including a proppant particle and a coating. The coating includes a hydrophobic coating, a cross-linked hydrogel, or both. From 1 to 50 wt. % of the plurality of proppants includes micro proppants having a particle size ranging from 0.5 to 150 μm, and from 50 to 99 wt. % of the plurality of proppants includes macro proppants having a particle size of 100 mesh or greater.

18 Claims, No Drawings

SLOW SETTLING MICRO-PROPPANTS FOR FAR FIELD STIMULATION

TECHNICAL FIELD

The present disclosure relates to fracturing fluids and more specifically, to fracturing fluids comprising micro-proppants to stimulate tight unconventional reservoirs including sandstone, shale and carbonate for oil and gas production.

BACKGROUND

Hydraulic fracturing is used to produce oil and gas from unconventional, tight formations by increasing the fracture surface area and total stimulated reservoir volume (SRV). Generally, a fracturing fluid, such as a low viscosity slickwater based fluid, is pumped into the formation at high rates, with proppant, to create a complex fracture. The proppant then keeps the fracture open, allowing the oil or gas to escape the formation. It is understood that in unconventional wells, most of the production comes from natural and induced fractures in the far field. The width of these far field fractures is often too small for standard proppants to enter in significant quantities.

Moreover, most of the proppants will settle before they can be placed in these far field fractures, due to the density of the proppants and low viscosity of the fluid. Increasing the viscosity of fluid to transport the proppants further in the formation is not a viable solution as high viscosity fluid increases the width of fractures but does not create the complex fractures associated with maximum production. Additionally, high viscosity fluids contain polymers or thickeners that need to be degraded after proppant placement to prevent proppant flow-back. Further still, the high viscosity fluids leave polymer residues, which can damage the formation and impede production.

One of the reasons for the steep decline in the production observed in the unconventional wells is insufficient stimulation of relatively small fractures in farfield i.e., natural and induced fractures. These fractures tend to close due to lack of proppant. It is estimated that roughly 90% of the fracture network volume may come from these small fractures. Thus, it is believed that stimulating and propping open the natural and induced fractures in the far field will support long-term production of oil and gas.

Currently, the petroleum exploration and production industry is using proppant particles as small as 100 mesh in unconventional wells. Most common definitions of 100 mesh proppant consider it to be all proppants ranging from 70 mesh (210 microns) to 140 mesh (105 microns). Due to the large size and high density of even the 100 mesh proppant, it is believed that up to 80% of the 100 mesh proppant will remain in the main fracture. The main fracture only represents 7% to 10% of the total stimulated reservoir volume (SRV). Given the lack of proppant, most of the fractures in the far field will close once the hydraulic fracturing stops or as pressure depletes, leading to rapid production decline.

In conventional wells, the formation may have a high permeability, such as a permeability of from 1 to 1000 milliDarcies (mD) and relatively larger pore spaces. Therefore, larger proppants, such as 20/40 mesh proppants, are used in hydraulic fracturing to produce the well at faster rate. To carry these larger proppants (such as 20/40 mesh), crosslinked high viscosity gels may be employed. The high viscosity gels also reduce fluid loss through high permeability formations.

SUMMARY

Unconventional and tight formations have very low permeability (0.000001 to 1 mD) and slickwater fracturing of these wells gained popularity in last 20 years. The unconventional wells have very low fluid loss due to low permeability. However, conventional production engineering techniques, as described above, are not successful in unconventional and tight formations. It has been discovered that low viscosity fluids that can make a longer fracture is important to stimulate unconventional wells. The low viscosity fluids create length but do not create wider fracture. It also creates more complex fracture. Initially 20/40 mesh proppants were used to stimulate the unconventional and tight formations, but this was not successful because low viscosity fluids are not able to carry large/heavy proppants (such as 20/40 mesh) in the fracture. Over time, smaller proppants such as 30/50 mesh were used, then 40/70 mesh, and then finally 100 mesh proppants. High pump rates such as 80 to 120 barrels per minute (bbl/min) must still be used to pump fracturing fluids including from 0.25 to 2 pound per gallon (ppg) of proppants into the fracture.

The use of a fracturing fluid including a plurality of proppants where from 1.0 wt. % to 50.0 wt. % of the plurality of proppants may include micro proppants with diameters from 0.5 micrometers ($\mu$m) to 150 $\mu$m; and from 50 to 99 wt. % of the plurality of proppants may include macro proppants (having a particle size of 100 mesh or greater, such as 40/70 mesh, 30/50 mesh, 20/40 mesh, or combinations thereof) is a novel method for stimulating unconventional fields. Micro proppants are conventionally limited for use in the pad fluid only. After pumping a designated volume and concentration of acid, pad fluid (which is a combination of water and chemicals) is pumped downhole to initiate hydraulic fractures by creating fracture length, height, and width before beginning the main proppant stage. Pad volume is extremely important to determine in order to prevent premature sand-off. It is believed that if sufficient fracture network is not created during this stage, a premature screen-out can be the consequence. The hydraulic fracture network is created throughout the entire treatment; however, the majority of the fracture network is created during pad injection. If not enough pad is pumped, at some point during the treatment the sand will reach the tip of the created fractures causing them to bridge with sand and eventually pack off all the fractures. The pad fluid can be anywhere from 2 to 20 vol. % of the total volume of fluid used for fracturing. The pad fluid volume is directly related to the fluid loss in the well, i.e. when there is less fluid loss in the well, the pad fluid volume is also less than the pad fluid volume when there is more fluid loss in the well. Higher fluid efficiency meaning lower fluid leakoff. The shale and other tight formations have lower leakoff and therefore lower pad fluid is pumped. Typically pad volume in unconventional wells on average will be approximately 5 vol. % of total volume of fluid pumped. For example, a fracturing stage stimulated with 600,000 gallons (gal) of fracturing fluid will have a 30,000 gal pad volume. In this stage the amount of proppant use will be around 600,000 pounds (lb). Generally, the microproppants are pumped at 0.1 to 0.25 ppg or lower concentration in pad fluid which means a total proppant amount of from 3000 to 7500 lb. This is around 0.5 to 1.25% of total amount of proppants pumped.

Conventionally, this relatively small volume of microproppants relative to the total amount of proppants used is due to a fear of screen-off. However, this disclosure notes that 90% of stimulated reservoir volume comes from induced and natural microfractures which need to be stimulated with micro proppants. This may be accomplished by pumping micro proppants not only in pad phase but also throughout the main fracturing operation. The smaller micro proppants can easily float on top of the dune to continue stimulating the newly created induced and natural fractures as the fracturing operation progress. The smaller proppants due to lower settling velocity will ride on top of the fluid column in the fracture and will reach the far field to stimulate the newly created induced fractures and the natural fractures. If the micro proppants are not pumped all the way only the main and secondary fracture will be stimulated and 90% of the stimulated reservoir volume (SRV) will be lost once fracturing stops, therefore leading to a quick decline in production. It is believed that a primary reason for the quick production decline in unconventional wells is the non-stimulation of these induced and natural fractures which closes quickly as the hydraulic fracturing pressure is removed and also over time as the well is produced.

Accordingly, new methods are desired which can enable placement of sufficient proppant in the small fractures of the far field.

Embodiments of the present disclosure meet this need by providing methods of using fracturing fluids to place relatively large quantities of micro proppants in the formation. Specifically, this need may be met by introducing a fracturing fluid into a petroleum formation where the fracturing fluid includes a plurality of proppants. From 1.0 wt. % to 50.0 wt. % of the plurality of proppants may include micro proppants with diameters from 0.5 micrometers (μm) to 150 μm. From 50 to 99 wt. % of the plurality of proppants may include macro proppants (having a particle size of 100 mesh or greater, such as 40/70 mesh, 30/50 mesh, 20/40 mesh, or combinations thereof). The fracturing fluid including micro proppants may be a pad fluid as well as a main treatment during fracturing operations.

According to the one embodiment of the present disclosure, a method of stimulating petroleum production may include introducing at least 100,000 gallons of a fracturing fluid per stage into a petroleum formation, thereby creating at least one fracture to stimulate the petroleum production. The fracturing fluid may be introduced into the petroleum formation at a pressure above the breakdown pressure of the formation, the fracturing fluid may include a plurality of proppants. From 1.0 wt. % to 50.0 wt. % of the plurality of proppants may include micro proppants with diameters from 0.5 micrometers (μm) to 150 μm. From 50 to 99 wt. % of the plurality of proppants may include macro proppants (having a particle size of 100 mesh or greater, such as 40/70 mesh, 30/50 mesh, 20/40 mesh, or combinations thereof). The fracturing fluid including micro proppants may be a pad fluid as well as a main treatment during fracturing operations.

In one embodiment, the fracturing fluid including the plurality of proppants is pulsed in the fluid alternatively with a fluid without the proppant (sweeps). It is contemplated that this technique helps with better abrasion and opening of the microfractures and prevents plugging and screen out issues.

In other embodiment the plurality of micro proppants and macro proppants are mixed with micro-degradable particles and pumped. The disappearance of the degradable particles will create channels and voids in the microfractures as well as in the main fracture. The amount of degradable material present in the plurality of proppants may be from 10 to 50 wt. % of the plurality of proppants. Another additional benefit of degradable particles is improved transport and less settling of the proppants.

Although the concepts of the present disclosure are described herein with primary reference to fracturing fluids, it is contemplated that the concepts will enjoy applicability to any fracturing fluid.

ABBREVIATIONS ppg=pounds per gallon.
psi=pounds per square inch.
wt. %=weight percent.
vol. %=volume percent.
μm=micrometer.
nm=nanometer.
g/cc=grams per cubic centimeter.
cp=centipoise.
bbl=barrel
ppt=pounds per thousand gallons
gpt=gallons per thousand gallons

DETAILED DESCRIPTION

Embodiments of the present disclosure are directed to methods of stimulating petroleum production from a petroleum formation by creating at least one fracture. The fractures of the present disclosure are created and propped open through the use of a fracturing fluid containing micro proppants (having a particle size from 0.5 micrometers (μm) to 150 μm) and proppants (having a particle size of 100 mesh or greater, such as 40/70 mesh, 30/50 mesh, 20/40 mesh, or combinations thereof). The fracturing fluid may include a plurality of proppants with a specific size distribution. This size distribution has a larger portion of those proppants in the smaller diameter ranges than the size distributions currently in use.

According to one embodiment of the present disclosure, a method of stimulating petroleum production may include introducing at least 100,000 gallons of a fracturing fluid into a petroleum formation, thereby creating at least one fracture to stimulate the petroleum production. The fracturing fluid may be introduced into the petroleum formation at a pressure above the breakdown pressure of the formation. The fracturing fluid may include a plurality of proppants and from 1.0 wt. % to 50.0 wt. % of the plurality of proppants may include micro proppants (having a particle size from 0.5 to 150 μm and 50 to 99 wt. % proppants (having a particle size of 100 mesh or greater, such as 40/70 mesh, 30/50 mesh, 20/40 mesh, or combinations thereof) of the total amount of proppants pumped.

A "petroleum formation," also referred to as a "petroleum reservoir," refers to a subterranean formation containing hydrocarbons. The hydrocarbons may be contained within porous or fractured rock formations. According to some embodiments, the petroleum formation may be an unconventional reservoir. The unconventional reservoir may include a shale, tight sandstone and carbonate reservoirs containing oil and gas, or a combination of these.

The fracturing fluid may be introduced into the petroleum formation by pumping the fracturing fluid into the petroleum formation at a pressure above the breakdown pressure of the petroleum formation. As used herein, the "breakdown pressure" may refer to the pressure at which the exposed rock of a formation fractures and allows fluid to be injected.

As used herein, a "fracturing fluid" may refer to a fracturing fluid optimized for the creation and propping open of fractures. Compared to conventional fracturing fluid, the fracturing fluid for unconventional and tight carbonate formations may have a lower viscosity and the fracturing fluids of the present disclosure have a greater amount of smaller proppants in comparison to the fracturing fluids that have been conventionally used in the industry as detailed below.

The at least one fracture may stimulate the petroleum formation by exposing more surface area of rock from which oil may be released. The at least one fracture may be held open by at least a portion of the plurality of micro proppants and macro proppants (having a particle size of 100 mesh or greater, such as 40/70 mesh, 30/50 mesh, 20/40 mesh, or combinations thereof) used in the fracturing fluid. The at least one fracture may be an induced fracture or the expansion of a natural fracture which is kept open by microproppants.

It is believed that micro-proppants of the present disclosure may be particularly useful for the propping open of relatively small fractures. It is believed that proppants must have a diameter less than 40% of the width of the fracture for the proppants to enter the fracture. The relatively small fractures may have a fracture width of less than 400 μm. For example, the relatively small fractures may have a fracture width of less than 350 μm, 300 μm, 250 μm, 200 μm, 150 μm, 100 μm, or even less than 100 μm. To keep these fractures open the size of micro proppant should be on average at least 40% smaller than the fracture width to prevent bridging at the face of fracture. It is contemplated that proppants having a particle size at least 3-4 times smaller than the fracture further reduce bridging at the face of the fracture.

At least 100,000 gallons of the fracturing fluid may be introduced into the petroleum formation. For example, at least 100,000 gallons, at least 250,000 gallons, at least 500,000 gallons, at least 750,000 gallons, at least 1,000,000 gallons, or even at least 1,500,000 gallons of the fracturing fluid may be introduced into the petroleum formation including a plurality of proppants. From 1 to 50 wt. % of the plurality of proppants may include micro proppants with diameters from 0.5 micrometers (μm) to 150 μm. From 50 to 99 wt. % of the plurality of proppants may include macro proppants (having a particle size of 100 mesh or greater, such as 40/70 mesh, 30/50 mesh, 20/40 mesh, or combinations thereof). The fracturing fluid introduced will be greater than 100,000 gallon and can be as much as 1000,000 gallons per stage. The amount of micro proppants pumped in the stage may be as low as 1 wt. % and as high as 50 wt. % of the total amount of proppants pumped, and any amount in between. The remainder of the plurality of proppants will be macro proppants (having a particle size of 100 mesh or greater, such as 40/70 mesh, 30/50 mesh, 20/40 mesh, or combinations thereof). The amount of micro proppants in the pad fluid can be increased from 0.5-1.25 wt. % to as high as 10.0 wt. %. More preferably the amount may be approximately 5 wt. %. This high concentration of micro proppants can travel to tip of the fracture and bridge it and prevent further fracture growth. To prevent this the micro proppants in the pad fluid can be alternated with fluid containing micro proppants and fluid without micro proppants so that no screen-off happens. In the main fracturing stage the amount of micro proppants in the fluid can be between 1 to 50 wt. % of total amount of proppants used. In some sub stages there may be only micro proppants and in others the plurality of proppants may include both micro proppants and macro proppants. The final 10-30 wt. % of proppants at the end of the fracturing stage will include only macro proppants (having a particle size of 100 mesh or greater, such as 40/70 mesh, 30/50 mesh, 20/40 mesh, or combinations thereof).

A fracturing fluid may include a plurality of proppants, from 1.0 wt. % to 10.0 wt. % of total amount of proppants pumped in a stage, the plurality of proppants may include proppants having a particle size from 0.5 micrometers (μm) to 150 μm that are exclusively pumped in the pad fluid. The pad fluid does not include any proppants having a larger size.

The fracturing fluid may include a plurality of proppants. From 1.0 wt. % to 50.0 wt. % of the plurality of proppants may include micro proppants with diameters from 0.5 micrometers (μm) to 150 μm. From 50 to 99 wt. % of the plurality of proppants may include macro proppants (having a particle size of 100 mesh or greater, such as 40/70 mesh, 30/50 mesh, 20/40 mesh, or combinations thereof). For example, at least 10 wt. %, at least 20 wt. %, at least 30 wt. %, at least 40 wt. %, or at least 50 wt. % of the plurality of proppants may include proppants with diameters from 0.5 μm to 150 μm. According to some embodiments, the plurality of proppants may include from 1.0 wt. % to 10 wt. %, from 10 wt. % to 20 wt. %, from 20 wt. % to 30 wt. %, from 30 wt. % to 40 wt. %, from 40 wt. % to 50 wt. %, from 1.0 wt. % to 50 wt. %, from 5.0 wt. % to 50 wt. %, from 10 wt. % to 50 wt. %, from 20 wt. % to 50 wt. %, from 30 wt. % to 50 wt. %, or any subset thereof, of proppants with diameters from 0.5 μm to 150 μm and 50 to 99 wt. % proppants (having a particle size of 100 mesh or greater, such as 40/70 mesh, 30/50 mesh, 20/40 mesh, or combinations thereof) of the total amount of proppants pumped.

From 1.0 wt. % to 50.0 wt. % of the plurality of proppants may include micro proppants having a particle size from 0.5 μm to 100 μm. For example, at least 10 wt. %, at least 20 wt. %, at least 30 wt. %, at least 40 wt. %, at least 50 wt. of the plurality of proppants may include micro proppants having a particle size from 0.5 μm to 150 μm. According to some embodiments, the plurality of proppants may include from 1.0 wt. % to 10 wt. %, from 10 wt. % to 20 wt. %, from 20 wt. % to 30 wt. %, from 30 wt. % to 40 wt. %, from 40 wt. % to 50 wt. %, from 05 wt. % to 50 wt. %, from 10 wt. % to 50 wt. %, from 20 wt. % to 50 wt. %, from 5 wt. % to 40 wt. %, from 10 wt. % to 30 wt. %, from 1.0 wt. % to 20 wt. %, from 1.0 wt. % to 30 wt. %, or any subset thereof, of micro proppants having a particle size from 0.5 μm to 100 μm. From 50 to 99 wt. % of the plurality of proppants may include macro proppants (having a particle size of 100 mesh or greater, such as 40/70 mesh, 30/50 mesh, 20/40 mesh, or combinations thereof).

The last 10 to 30 wt. % of the plurality of proppants injected will be macro proppants because this last 10 to 30 wt. % of the plurality of proppants will be nearer to the wellbore than the preceding 70 to 90 wt. %. The size of the macro proppants may be 100 mesh, 40/70, 30/50 and/or 20/40 mesh or any combination thereof.

According to some embodiments, at least 50 wt. % of total proppants of the plurality of proppants pumped may include macro proppants having a particle size larger than 150 μm. For example, at least 50 wt. %, at least 60 wt. %, from 50 wt. % to 99 wt. %, from 60 wt. % to 90 wt. %, or any subset thereof of the plurality of proppants may include macro proppants having a particle size larger than 200 μm, larger than 250 μm, larger than 300 μm, or larger than 500 μm. Without being limited by theory, it is believed that micro proppants may not be sufficient to prop open the largest fractures on their own. Accordingly, it may be desirable to have a population of micro proppants smaller than at least 150 μm for the smaller fractures (fractures less than 300 μm in fracture width) and a population of macro proppants larger than 150 µm for the larger fractures (fractures greater than 300 µm in fracture width).

According to some embodiments, a second fluid may be introduced into the petroleum formation after the fracturing fluid. The second fluid need not be the final fluid introduced into the petroleum formation or even the second fluid introduced into the petroleum formation. For example, the second fluid may be followed by a third fluid, more of the fracturing fluid may be introduced into the formation after the second fluid, or a third fluid may be introduced into the formation before the fracturing fluid. According to some embodiments, the second fluid may include at least 40 wt. % of the total weight of fracturing fluid introduced into the formation.

The second fluid may include a second population of proppant particles and the second population of proppant particles may include at least 50 wt. % of proppant particles larger than 150 µm. For example, the second population of proppant particles may include at least 50 wt. %, at least 60 wt. %, at least 70 wt. %, at least 80 wt. %, at least 90 wt. %, or even at least 99 wt. % of proppant particles larger than 150 µm, larger than 200 µm, larger than 250 µm, larger than 300 µm, larger than 500 µm, from 200 µm to 850 µm, or any subset thereof.

The volume ratio of fracturing fluid:second fracturing fluid introduced into the petroleum formation may be from 10:1 to 1:10. For example, the volume ratio of fracturing fluid:second fracturing fluid introduced into the petroleum formation may be from 8:1 to 1:10, from 6:1 to 1:10, from 4:1 to 1:10, from 2:1 to 1:10, from 1:1 to 1:10, from 10:1 to 1:8, from 10:1 to 1:6, from 10:1 to 1:4, from 10:1 to 1:2, from 10:1 to 1:1, from 8:1 to 1:8, from 6:1 to 1:6, from 4:1 to 1:4, from 2:1 to 1:2, or any subset thereof.

In embodiments, a first volume of the fracturing fluid from 5 to 20 vol. %, from 5 to 17 vol. %, from 5 to 15 vol. %, from 5 to 12 vol. %, from 5 to 10 vol. %, from 10 to 20 vol. %, from 10 to 17 vol. %, from 10 to 15 vol. %, from 10 to 12 vol. %, from 12 to 20 vol. %, from 12 to 17 vol. %, from 12 to 15 vol. %, from 15 to 20 vol. %, from 15 to 17 vol. %, or from 17 to 20 vol. % of the fracturing fluid may include a first amount of proppants having a diameter from 0.5 to 100 µm, from 0.5 to 80 µm, from 0.5 to 60 µm, from 0.5 to 40 µm, from 0.5 to 22 µm, from 0.5 to 20 µm, from 0.5 to 17 µm, from 0.5 to 15 µm, from 0.5 to 12 µm, from 0.5 to 10 µm, from 0.5 to 5 µm, from 5 to 100 µm, from 5 to 80 µm, from 5 to 60 µm, from 5 to 40 µm, from 5 to 22 µm, from 5 to 20 µm, from 5 to 17 µm, from 5 to 15 µm, from 5 to 12 µm, from 5 to 10 µm, from 10 to 100 µm, from 10 to 80 µm, from 10 to 60 µm, from 10 to 40 µm, from 10 to 22 µm, from 10 to 20 µm, from 10 to 17 µm, from 10 to 15 µm, from 10 to 12 µm, from 12 to 100 µm, from 12 to 80 µm, from 12 to 60 µm, from 12 to 40 µm, from 12 to 22 µm, from 12 to 20 µm, from 12 to 17 µm, from 12 to 15 µm, from 15 to 100 µm, from 15 to 80 µm, from 15 to 60 µm, from 15 to 40 µm, from 15 to 22 µm, from 15 to 20 µm, from 15 to 17 µm, from 17 to 100 µm, from 17 to 80 µm, from 17 to 60 µm, from 17 to 40 µm, from 17 to 22 µm, from 17 to 20 µm, from 20 to 100 µm, from 20 to 80 µm, from 20 to 60 µm, from 20 to 40 µm, or from 20 to 22 µm in diameter. In embodiments, a second volume of the fracturing fluid from 5 to 70 vol. %, from 5 to 50 vol. %, from 5 to 30 vol. %, from 5 to 20 vol. %, from 5 to 17 vol. %, from 5 to 15 vol. %, from 5 to 12 vol. %, from 5 to 10 vol. %, from 10 to 20 vol. %, from 10 to 17 vol. %, from 10 to 15 vol. %, from 10 to 12 vol. %, from 12 to 20 vol. %, from 12 to 17 vol. %, from 12 to 15 vol. %, from 15 to 20 vol. %, from 15 to 17 vol. %, or from 17 to 20 vol. % of the fracturing fluid may include a second amount of proppant particles. The second amount of proppant particles may include (i) from 1 to 50 wt. % proppant particles having a diameter from 0.5 to 150 µm, from 0.5 to 100 µm, from 0.5 to 75 µm, from 0.5 to 55 µm, from 0.5 to 50 µm, or a diameter of approximately 50 µm by weight of the second amount of proppant particles and (ii) from 50 to 99 wt. % proppant particles having a diameter of from 105 µm to 250 µm by weight of the second amount of proppant particles. In embodiments, a final volume of the fracturing fluid from 10.0 to 30 vol. %, from 10 to 20 vol. %, from 10 to 15 vol. %, or approximately 10 vol. % of the fracturing fluid may include a third amount of proppant particles. The third amount of proppant particles may have a diameter larger than 250 µm. The first volume, the second volume, and the final volume of the fracturing fluid may be introduced in sequential order. The above volume percentages of the fracturing fluid are to be calculated including the pad fluid.

In embodiments, the first volume of the fracturing fluid may include proppant particles less than 20.0 µm in diameter, less than 40.0 µm in diameter, less than 60.0 µm in diameter, less than 80.0 µm in diameter and less than 100.0 µm in diameter. For example, at least 50 wt. %, at least 60 wt. %, at least 70 wt. %, at least 80 wt. %, at least 90 wt. %, or even at least 95 wt. %, of the proppant particles in the first 15 wt. % of the fracturing fluid may be less than 20 µm, 30 µm, 40 µm, or 50 µm in diameter.

As stated above, the second volume of the fracturing fluid may include the second amount of proppant particles. The second amount of proppant particles may include (i) from 1 to 50 wt. % proppant particles having a diameter from 0.5 to 150 µm, from 0.5 to 100 µm, from 0.5 to 75 µm, from 0.5 to 55 µm, from 0.5 to 50 µm, or a diameter of approximately 50 µm by weight of the second amount of proppant particles and (ii) from 50 to 99 wt. % proppant particles having a diameter of from 105 µm to 250 µm by weight of the second amount of proppant particles. For example, at least 5 wt. %, at least 10 wt. %, at least 20 wt. %, at least 30 wt. %, at least 40 wt. %, or even at least 50 wt. %, of the proppant particles in the second volume of the fracturing fluid may be less than 100 µm in diameter.

As stated above, the final volume of the fracturing fluid may include proppant particles larger than 250 µm in diameter. For example, at least 50 wt. %, at least 60 wt. %, at least 70 wt. %, at least 80 wt. %, at least 90 wt. %, or even at least 99 wt. %, of the proppant particles in the final 10.0 wt. % of the fracturing fluid may have diameters larger than 250 µm. The proppant particles with diameters larger than 250 µm may be 40/70 mesh, 30/50 mesh, 20/40 mesh, 16/30 mesh, or any subset thereof.

The plurality of proppant particles may have a size distribution such that at least 20 wt. % of the plurality of proppant particles may have a diameter less than 20 µm, at least 50 wt. % of the plurality of proppant particles may have a diameter less than 50 µm, and at least 90 wt. % of the plurality of proppant particles may have a diameter less than 100 µm. It should be understood that all three size cutoffs describe the same population of proppant particles and thus the at least 20 wt. % of the plurality of proppant particles with a diameter less than 20 µm is included in the at least 50 wt. % with a diameter less than 50 µm.

From 10 wt. % to 90 wt. % of the plurality of proppant particles may have diameters from 0.5 µm to 50 µm and from 10 wt. % to 90 wt. % of the plurality of proppant particles may have diameters less than 150 µm. For example, from 10 wt. % to 80 wt. %, from 10 wt. % to 70 wt. %, from 10 wt.

%, to 60 wt. %, from 10 wt. % to 50 wt. %, from 10 wt. %, to 40 wt. %, from 10 wt. % to 30 wt. %, from 20 wt. % to 90 wt. %, from 30 wt. % to 90 wt. %, from 40 wt. % to 90 wt. %, from 50 wt. %, to 90 wt. %, from 60 wt. % to 90 wt. %, from 70 wt. % to 90 wt. %, from 20 wt. % to 80 wt. %, from 30 wt. % to 70 wt. %, or any subset thereof, of the plurality of proppant particles may have diameters from 0.5 µm to 50 µm. For example, from 10 wt. % to 80 wt. %, from 10 wt. % to 70 wt. %, from 10 wt. %, to 60 wt. %, from 10 wt. % to 50 wt. %, from 10 wt. %, to 40 wt. %, from 10 wt. % to 30 wt. %, from 20 wt. % to 90 wt. %, from 30 wt. % to 90 wt. %, from 40 wt. % to 90 wt. %, from 50 wt. % to 90 wt. %, from 60 wt. % to 90 wt. %, from 70 wt. % to 90 wt. %, from 20 wt. % to 80 wt. %, from 30 wt. % to 70 wt. %, or any subset thereof, of the plurality of proppant particles may have less than 150 µm.

The fracturing fluid further may include a plurality of degradable microparticles in addition to the micro proppants and the macro proppants. The degradable microparticles may include salt particles that dissolve in water, particles of degradable material that hydrolyze or disintegrate in water, oil soluble particles, or combinations thereof. Without being limited by theory, it is believed that the plurality of degradable microparticles may provide better suspension of the proppants in the fluid by increasing fluid density. It is further believed that the degradable microparticles and the proppants may form a solid matrix in the fracture, then the degradation of the microparticles may form channels through the matrix through which oil can be produced and thus enhancing the permeability of the proppant pack in induced fractures, natural fractures, secondary fractures, main fractures, or combinations thereof.

The conditions that degrade the particles may include dissolution in water, dissolution in oil, hydrolysis in an aqueous media to a simpler molecule that dissolves in water or oil in the well environment. The greater the temperature of the well, the quicker the dissolution or degradation will occur. The microparticles are expected to remain intact at least during the pumping process which may range from 1 hour to 3 hours long. Therefore, a slow dissolving material and slow degrading material is needed that will stay intact for 1 to 3 hours. Since unconventional wells now a days can have anywhere from 20-80 stages and if it takes 3 hour per stage to fracture than for whole of the well it may take from 60-240 hours to complete the well before it can be flowed back. So if the material can degrade in this time frame that will also be acceptable. Some particles takes longer time to degrade in low temperature wells (120-180 F), It may be required to add external stimuli or use materials that degrade in these wells. In wells where there is no oil and only production of gas heat with moisture will work to hydrolyze the degradable particles. Water soluble particles include rock salt, benzoic acid, borate salts, or combinations thereof. Oil soluble particles include polyvinyl alcohols, polystyrene, waxes etc. Hydrolyzable particles are poly(lactic acid), poly(glycolic acid), poly(orthoesters), poly(anhydride), polyphosphagene, or combinations thereof. It is contemplated that the microparticles degrade in the well environment and injected fluid without any external intervention.

The degradable microparticles may have diameters from 0.5 µm to 150 µm. For example, the degradable microparticles may have diameters less than 140 µm, less than 130 µm, less than 120 µm, less than 100 µm, less than 80 µm, less than 60 µm, less than 40 µm, from 2 µm to 150 µm, from 10 µm to 150 µm, from 20 µm to 150 µm, from 40 µm to 150 µm, from 60 µm to 150 µm, from 80 µm to 150 µm, from 100 µm to 150 µm, or any subset thereof.

The plurality of proppants may include from 5 wt. % to 50 wt. % degradable microparticles. For example, the plurality of proppants may include from 5 to 50 wt. %, from 5 to 40 wt. %, from 5 to 30 wt. %, from 5 to 20 wt. %, from 5 to 10 wt. %, from 10 to 50 wt. %, from 10 to 40 wt. %, from 10 to 30 wt. %, from 10 to 20 wt. %, from 20 wt. % to 50 wt. %, from 30 wt. % to 50 wt. %, from 40 wt. % to 50 wt. %, from 20 wt. % to 40 wt. %, from 20 wt. % to 30 wt. %, or or from 30 wt. % to 40 wt. % degradable microparticles.

According to embodiments, the degradable microparticles may be added during the pad fluid stage. In embodiments, the degradable microparticles may be added during the first half of proppant pumping. In embodiments, the degradable microparticles may be added at any time during proppant pumping.

The fracturing fluid may include nano and micro particles of degradable material. The nanoparticles of degradable material may have a particle size from 500 to 2000 nanometers (nm) or micro particles from 2 micron to 150 micron in size. In embodiments, the nanoparticles of degradable material may have a particle size from 500 to 2000 nm, from 500 to 1750 nm, from 500 to 1500 nm, from 500 to 1250 nm, from 500 to 1000 nm, from 500 to 750 nm, from 750 to 1750 nm, from 750 to 1500 nm, from 750 to 1250 nm, from 750 to 1000 nm, from 1000 to 1750 nm, from 1000 to 1500 nm, from 1000 to 1250 nm, from 1250 to 1750 nm, from 1250 to 1500 nm, from 1500 to 1750 nm, or from 1750 to 2000 nm.

The plurality of proppants may include from 5 wt. % to 50 wt. % degradable nanoparticles. For example, the plurality of proppants may include from 5 to 50 wt. %, from 5 to 40 wt. %, from 5 to 30 wt. %, from 5 to 20 wt. %, from 5 to 10 wt. %, from 10 to 50 wt. %, from 10 to 40 wt. %, from 10 to 30 wt. %, from 10 to 20 wt. %, from 20 wt. % to 50 wt. %, from 30 wt. % to 50 wt. %, from 40 wt. % to 50 wt. %, from 20 wt. % to 40 wt. %, from 20 wt. % to 30 wt. %, or or from 30 wt. % to 40 wt. % degradable nanoparticles.

The fracturing fluid may include from 0.1 to 5 pounds per gallon (ppg), from 0.1 to 4.5 ppg, from 0.1 to 4 ppg, from 0.1 to 3.5 ppg, from 0.1 to 3 ppg, from 0.1 to 2.5 ppg, from 0.1 to 2 ppg, from 0.1 to 1.5 ppg, from 0.1 to 1 ppg, from 0.1 to 0.5 ppg, from 0.5 to 5 ppg, from 0.5 to 4.5 ppg, from 0.5 to 4 ppg, from 0.5 to 3.5 ppg, from 0.5 to 3 ppg, from 0.5 to 2.5 ppg, from 0.5 to 2 ppg, from 0.5 to 1.5 ppg, from 0.5 to 1 ppg, from 1 to 5 ppg, from 1 to 4.5 ppg, from 1 to 4 ppg, from 1 to 3.5 ppg, from 1 to 3 ppg, from 1 to 2.5 ppg, from 1 to 2 ppg, from 1 to 1.5 ppg, from 1.5 to 5 ppg, from 1.5 to 4.5 ppg, from 1.5 to 4 ppg, from 1.5 to 3.5 ppg, from 1.5 to 3 ppg, from 1.5 to 2.5 ppg, from 1.5 to 2 ppg, from 2 to 5 ppg, from 2 to 4.5 ppg, from 2 to 4 ppg, from 2 to 3.5 ppg, from 2 to 3 ppg, from 2 to 2.5 ppg, from 2.5 to 5 ppg, from 2.5 to 4.5 ppg, from 2.5 to 4 ppg, from 2.5 to 3.5 ppg, from 2.5 to 3 ppg, from 3 to 5 ppg, from 3 to 4.5 ppg, from 3 to 4 ppg, from 3 to 3.5 ppg, from 3.5 to 5 ppg, from 3.5 to 4.5 ppg, from 3.5 to 4 ppg, from 4 to 5 ppg, from 4 to 4.5 ppg, or from 4.5 to 5 ppg of the nanoparticles or microparticles of degradable material.

Both the nanoparticles and microparticles of degradable material may include particles of any shape, such as fibers, spherical particles, and particles of random shape. Without being limited by theory, it is believed that the both the nanoparticles and microparticles improve suspension of the proppant. The degradable particles will also prop open the fractures, then begin to degrade or dissolve, forming voids which increase the conductivity of the fracture to petroleum.

The degradable nanoparticles and degradable microparticles may include one or more of polylactic acid (PLA), polyglycolic acid (PGA), polyorthoesters, polyesters, salts, rock salt, polyvinyl alcohol particles, wax particles, benzoic acid. It should be understood that if degradable nanoparticles and degradable microparticles are present in the same mixture, they need not be made of the same material.

The plurality of proppants may be present in the fracturing fluid at a concentration of 0.1 pounds per gallon (ppg) to 10 ppg. For example, the plurality of proppant particles with diameters from 0.5 μm to 150 μm may be present in the fracturing fluid at a concentration of from 0.1 to 10 ppg, from 0.1 to 8 ppg, from 0.1 to 6 ppg, from 0.1 to 4 ppg, from 0.1 to 2 ppg, from 0.1 to 1 ppg, from 1 to 10 ppg, from 1 to 8 ppg, from 1 to 6 ppg, from 1 to 4 ppg, from 1 to 2 ppg, from 2 to 10 ppg, from 2 to 8 ppg, from 2 to 6 ppg, from 2 to 4 ppg from 4 to 10 ppg, from 4 to 8 ppg, from 4 to 6 ppg, from 6 to 10 ppg, from 6 to 8 ppg, or from 8 to 10 ppg.

In embodiments, at least a portion of the proppants may have a self-agglomerating coating. For example, at least 10 wt. %, at least 20 wt. %, at least 30 wt. %, at least 40 wt. %, at least 50 wt. %, at least 60 wt. %, at least 70 wt. %, at least 80 wt. %, or at least 90 wt. % of the proppants may have the self-agglomerating coating. The self-agglomerating coating may be a hydrophobic coating, an adhesive coating, zeta potential altering material coating, sticky material coating, or combinations thereof.

The plurality of proppants may include a coating. In embodiments, the coating may coat a proppant particle, forming a proppant. The proppant particle may be chosen from any type of proppant suitable for use in hydraulic fracturing applications. As previously described, proppants are propping agent particles used in hydraulic fracturing fluids to maintain and hold open subsurface fractures during or following subsurface treatment. In some embodiments, the proppant particle may include particles of materials such as oxides, silicates, sand, ceramic, resin, epoxy, plastic, mineral, glass, or combinations thereof. For instance, the proppant particle may include graded sand, treated sand, ceramic, or plastic. The proppant particle may include particles of bauxite, sintered bauxite, $Ti^{4+}$/polymer composites, where the superscript "4+" stands for the oxidation state of titanium, titanium nitride (TiN), or titanium carbide. The proppant particle may include glass particles or glass beads. Embodiments of the present disclosure may utilize at least one proppant particle and in embodiments in which more than one proppant particle is used, the proppant particles may contain a mixture of two or more different materials. The material of the proppant particle may be chosen based on the particular application and characteristics desired, such as the depth of the subsurface formation in which the proppant particles will be used, as proppant particles with greater mechanical strength are needed at greater lithostatic pressures. For instance, ceramic proppant materials exhibit greater strength, thermal resistance, and conductivity than sands. Additionally, ceramic proppant materials have more uniform size and shape than sands The proppants may have an API crush strength of at least 4,000 pounds per square inch (psi). For example, the proppants may have a crush strength of at least 6,000 psi, at least 8,000 psi, at least 10,000 psi, at least 12,500 psi, at least 15,000 psi, at least 17,500 psi, or even at least 30,000 psi.

The proppants may have a density less than 3.8 g/cc, 3.0 g/cc, 2.6 g/cc, 2 grams per cubic centimeter (g/cc), less than 1.75 g/cc, less than 1.5 g/cc, less than 1.25 g/cc, less than 1 g/cc, less than 0.9 g/cc, less than 0.8 g/cc, less than 0.7 g/cc, less than 0.6 g/cc, or less than 0.5 g/cc. Without being limited by theory, it is believed that proppants of lesser density will have longer settling times and thus will be more likely to reach the fractures furthest from the wellbore. High strength bauxite has density of approximately 3.8 g/cc and sand has a density of approximately 2.6 g/cc. Intermediate strength ceramic proppants may have a density of from 2.5 to 3.0 g/cc.

The plurality of proppants may have from 0.1 to 15 wt. % coating by weight of the proppants. In embodiments, the plurality of proppants may have from 0.1 to 15 wt. %, from 0.1 to 12 wt. %, from 0.1 to 10 wt. %, from 0.1 to 7 wt. %, from 0.1 to 5 wt. %, from 0.1 to 4 wt. %, from 0.1 to 3 wt. %, from 0.1 to 2 wt. %, from 0.1 to 1 wt. %, from 1 to 15 wt. %, from 1 to 12 wt. %, from 1 to 10 wt. %, from 1 to 7 wt. %, from 1 to 5 wt. %, from 1 to 4 wt. %, from 1 to 3 wt. %, from 1 to 2 wt. %, from 2 to 15 wt. %, from 2 to 12 wt. %, from 2 to 10 wt. %, from 2 to 7 wt. %, from 2 to 5 wt. %, from 2 to 4 wt. %, from 2 to 3 wt. %, from 3 to 15 wt. %, from 3 to 12 wt. %, from 3 to 10 wt. %, from 3 to 7 wt. %, from 3 to 5 wt. %, from 3 to 4 wt. %, from 4 to 15 wt. %, from 4 to 12 wt. %, from 4 to 10 wt. %, from 4 to 7 wt. %, from 4 to 5 wt. %, from 5 to 15 wt. %, from 5 to 12 wt. %, from 5 to 10 wt. %, from 5 to 7 wt. %, from 7 to 15 wt. %, from 7 to 12 wt. %, from 7 to 10 wt. %, from 10 to 15 wt. %, from 10 to 12 wt. %, or from 12 to 15 wt. % coating by weight of the plurality of proppants. It should be understood that the weight ratio of coating to proppants should be taken as an average across all proppants in the fracturing fluid and all coating material attached said proppants.

As previously stated, the plurality of proppants may include a coating that coats the proppant particles. The coating may have an average thickness of at least 1 μm. For example, and not by way of limitation, the coating may have an average thickness of at least 2 μm, at least 3 μm, at least 5 μm, or at least 10 μm. In embodiments, the coating may have a thickness of from 1 to 15 μm, from 1 to 12 μm, from 1 to 10 μm, from 1 to 7 μm, from 1 to 5 μm, from 1 to 4 μm, from 1 to 3 μm, from 1 to 2 μm, from 2 to 15 μm, from 2 to 12 μm, from 2 to 10 μm, from 2 to 7 μm, from 2 to 5 μm, from 2 to 4 μm, from 2 to 3 μm, from 3 to 15 μm, from 3 to 12 μm, from 3 to 10 μm, from 3 to 7 μm, from 3 to 5 μm, from 3 to 4 μm, from 4 to 15 μm, from 4 to 12 μm, from 4 to 10 μm, from 4 to 7 μm, from 4 to 5 μm, from 5 to 15 μm, from 5 to 12 μm, from 5 to 10 μm, from 5 to 7 μm, from 7 to 15 μm, from 7 to 12 μm, from 7 to 10 μm, from 10 to 15 μm, from 10 to 12 μm, or from 12 to 15 μm. The coating may be monolayer or bilayer coating in some cases.

The coating may be a hydrophobic coating and a gas may be introduced into the petroleum formation with the fracturing fluid. Without being limited by theory, it is believed that the hydrophobic interaction of the coated proppants will form a proppant agglomerate in the fractures. Additionally, it is believed that the fracturing fluid and the gas will intermix in the wellbore, forming gas bubbles. The gas bubbles are believed to form thin layer on the coated proppant, allowing them to be more easily picked up, kept in suspension and more effectively transported within the turbulent flow, resulting in better proppant distribution in the fracture as well as stimulating the micro and induced fractures. The formation of a layer of gas bubbles on the coated proppant are believed to increase settling times.

In some embodiments, the proppant particles may have a rough surface texture that may increase adhesion of the coating to the proppant particle. The surfaces of the proppant particles may be roughened to increase the surface area of the proppant particle by any suitable physical or chemical method, including, for example, using an appropriate etchant. In some embodiments, the proppant particle may have a surface that provides a desired adhesion of the fluorinated polyurethane proppant coating to the proppant particle or may already be sufficiently rough without a need for chemical or physical roughening. Specifically, ball milling proppant particles may provide relatively rounder particles as well as particles with increased surface roughness.

The term "rough" refers to a surface having at least one deviation from the normalized plane of the surface, such as a depression or protrusion. The surface may be uneven and irregular and may have one or more imperfections, such as dimples, stipples, bumps, projections or combinations of these. The rough surface may have an arithmetic average roughness ($R_a$) of greater than or equal to 1 nanometer (nm) (1 nm=0.001 μm). $R_a$ is defined as the arithmetic average of the differences between the local surface heights and the average surface height and can be described by Equation 1, contemplating n measurements:

$$R_a = \frac{1}{n}\sum_{i=1}^{n}|y_i|$$ EQUATION 1

In Equation 1, each $y_i$ is the amount of deviation from the normalized plane of the surface (meaning the depth or height of a depression or protrusion, respectively) of the absolute value of the ith of n measurements. Thus, $R_a$ is the arithmetic average of the absolute values of n measurements of deviation y from the normalized plane of the surface. In some embodiments, the surface of the proppant particle may have an $R_a$ of greater than or equal to 2 nm (0.002 μm), or greater than or equal to 10 nm (0.01 μm), or greater than or equal to 50 nm (0.05 μm), or greater than or equal to 100 nm (0.1 μm), or greater than or equal to 1 μm.

A gas may be introduced into the petroleum formation with the fracturing fluid. The gas may include an inert gas or another gas, which does not chemically interact inside the petroleum formation. The gas may include one or more of nitrogen, air and carbon dioxide.

The volume of gas introduced into the petroleum formation may range from 1 volume percent (vol. %) to 40 vol. %, relative to the volume of the fracturing fluid. For example, the volume of gas introduced into the petroleum formation may range from 1 vol. % to 35 vol. %, 1 vol. % to 30 vol. %, 1 vol. % to 25 vol. %, 1 vol. % to 20 vol. %, 1 vol. % to 15 vol. %, 1 vol. % to 10 vol. %, 1 vol. % to 5 vol. %, 5 vol. % to 30 vol. %, 10 vol. % to 30 vol. %, 15 vol. % to 30 vol. %, 20 vol. % to 30 vol. %, 5 vol. % to 25 vol. %, 10 vol. % to 20 vol. %, or any subset thereof.

The coating may be a hydrophobic coating and the hydrophobic coating may include one or more organosilanes, organosiloxanes, fluoro-organosilanes, fluoro-organosiloxanes, polysiloxanes, organo fluorocarbons, organo perfluorocarbons, long chain hydrocarbons, polyolefins, polyesters, acrylic polymers, or vinyl polymers. The long chain hydrocarbons may include from C8 to C22, from C8 to C20, from C8 to C18, from C8 to C15, from C8 to C13, from C8 to C10, from C10 to C22, from C10 to C20, from C10 to C18, from C10 to C15, from C10 to C13, from C13 to C22, from C13 to C20, from C13 to C18, from C13 to C15, from C15 to C22, from C15 to C20, from C15 to C18, from C18 to C22, from C18 to C20, or from from C20 to C22 hydrocarbons.

The proppant may be coated with the hydrophobic coating in situ by adding proppant and the hydrophobic coating agent to the fracturing fluid during the pumping operation. Alternatively, the proppant may be treated on the surface before adding it to fracturing fluid or it may be pretreated in the manufacturing facility. In some cases, the proppant may be treated, dried, and stored for later use.

The hydrophobic coating agent may be added to the fracturing fluid such that the concentration is from 0.25 gallons per thousand gallons (gpt) to 3 gpt of the fluid. It may be desirable that the coating coat the proppant partially or fully so that the proppants will agglomerate together. For example, the hydrophobic coating may be added to the fracturing fluid such that the concentration is from 0.25 gpt to 2.75 gpt, from 0.25 gpt to 2.5 gpt, from 0.25 gpt to 2.25 gpt, from 0.25 gpt to 2.0 gpt, from 0.5 gpt to 3 gpt, from 0.75 gpt to 3 gpt, from 1 gpt to 3 gpt, from 0.5 gpt to 2.75 gpt, from 0.75 gpt to 2.5 gpt, from 1 gpt to 2.25 gpt, from 1.25 gpt to 2.0 gpt, or any subset thereof.

The coating may be a cross-linked hydrogel. Without being limited by theory the hydrogel may absorb water from the environment (such as an aqueous fracturing fluid) and swell to create low-density floating and suspended proppants.

The cross-linked hydrogel coating may be at least 1 wt. % by weight of the proppants. For example, the cross-linked hydrogel coating may be at least 2 wt. %, at least 3 wt. %, at least 5 wt. %, at least 10 wt. %, or even at least 15 wt. % by weight of the proppants. In embodiments, the plurality of proppant particles may have from 0.1 to 15 wt. %, from 0.1 to 12 wt. %, from 0.1 to 10 wt. %, from 0.1 to 7 wt. %, from 0.1 to 5 wt. %, from 0.1 to 4 wt. %, from 0.1 to 3 wt. %, from 0.1 to 2 wt. %, from 0.1 to 1 wt. %, from 1 to 15 wt. %, from 1 to 12 wt. %, from 1 to 10 wt. %, from 1 to 7 wt. %, from 1 to 5 wt. %, from 1 to 4 wt. %, from 1 to 3 wt. %, from 1 to 2 wt. %, from 2 to 15 wt. %, from 2 to 12 wt. %, from 2 to 10 wt. %, from 2 to 7 wt. %, from 2 to 5 wt. %, from 2 to 4 wt. %, from 2 to 3 wt. %, from 3 to 15 wt. %, from 3 to 12 wt. %, from 3 to 10 wt. %, from 3 to 7 wt. %, from 3 to 5 wt. %, from 3 to 4 wt. %, from 4 to 15 wt. %, from 4 to 12 wt. %, from 4 to 10 wt. %, from 4 to 7 wt. %, from 4 to 5 wt. %, from 5 to 15 wt. %, from 5 to 12 wt. %, from 5 to 10 wt. %, from 5 to 7 wt. %, from 7 to 15 wt. %, from 7 to 12 wt. %, from 7 to 10 wt. %, from 10 to 15 wt. %, from 10 to 12 wt. %, or from 12 to 15 wt. % cross-linked hydrogel coating by weight of the plurality of proppant particles. It should be understood that the weight ratio of cross-linked hydrogel to proppant particles should be taken as an average across all proppant particles in the fracturing fluid and all hydrogel coating adhered to said proppant particles.

The cross-linked hydrogel coating may have an average thickness of from 1 to 15 μm, from 1 to 12 μm, from 1 to 10 μm, from 1 to 7 μm, from 1 to 5 μm, from 1 to 3 μm, from 1 to 2 μm, from 2 to 15 μm, from 2 to 12 μm, from 2 to 10 μm, from 2 to 7 μm, from 2 to 5 μm, from 2 to 3 μm, from 3 to 15 μm, from 3 to 12 μm, from 3 to 10 μm, from 3 to 7 μm, from 3 to 5 μm, from 5 to 15 μm, from 5 to 12 μm, from 5 to 10 μm, from 5 to 7 μm, from 7 to 15 μm, from 7 to 12 μm, from 7 to 10 μm, from 10 to 15 μm, from 10 to 12 μm, or from 12 to 15 μm. For example, the cross-linked hydrogel coating may have an average thickness of at least 2 μm, at least 3 μm, at least 5 μm, or at least 10 μm. The hydrogel coating may swell from 1% to 1000% in the aqueous fracturing fluid thus providing buoyancy to the particles which results in slow settling and better transport to far field.

The hydrogel may include cross-linked water soluble polymers such as those prepared by polymerizing or copolymerization of monomers and cross linkers. Monomers may include one or more of acrylamide, acrylic acid, 2-acrylamido-2-methylpropane sulfonic acid (AMPS), N,N-dimethyl acrylamide, methyl methacrylate, methyl acrylate, n-vinyl pyrrolidone, N-vinylformamide, diallyldimethylammonium chloride, and acrylamidopropyltrimonium chloride. Crosslinkers may include bis-acrylamide, N,N-methylenebisacrylamide, divinyl benzene, glutareldehyde, epichlorohydrin, zn ions, borzte ions, metal ions, or combinations thereof. The gels can be physically crosslinked hydrogels or chemically crosslinked hydrogels. The crosslinker can also be degradable crosslinker with degradable groups in them. These groups can be ester, amide, acetal, orthoester, esteramide, carbonate, urethane and the like. Physical crosslinked gels can be formed by hydrophobic interaction of groups in hydrogel, interaction of oppositely charged groups to crosslink, or combinations thereof.

At least a portion of the plurality of proppant particles may be coated with an adhesive material. For example, at least 90 wt. % of the plurality of proppant particles smaller than 20 μm, smaller than 30 μm, smaller than 40 μm, or smaller than 50 μm may be coated with the adhesive material. The adhesive material may include polyvinyl acetate, polyvinyl pyridine, zetapotential altering compositions such as alkylpyridine internal salt with derivatized phosphoric acid, polyamide, polyesters, polycarbonate, polyvinyl pyridine, resin, shellac, silyl modified polyamide compounds, or combinations thereof. In embodiments, the adhesive material may include polyvinyl acetate. Without being limited by theory, it is believed that coating the proppant particles with an adhesive material may cause the smaller proppants to agglomerate in the fracture and prevent them from flowing back towards the wellbore during production.

At least a portion of any proppant particles larger than 150 μm may be resin coated. For example, at least 30 wt. %, at least 40 wt. %, at least 50 wt. % at least 60 wt. %, at least 70 wt. %, at least 80 wt. %, or at least 90 wt. %, of any proppant particles larger than 150 μm, larger than 200 μm, larger than 250 μm, larger than 350 μm, larger than 500 μm, or larger than 600 μm, may have a resin coating.

The resin coating may include resin. Resin is a solid or viscous substance of plant or synthetic origin that is typically convertible into polymers, and may be a mixture of organic compounds such as terpenes, an organic compound produced by plants. The viscosity of resin may be greater than 20 centiPoise (cP), measured at a temperature of 120° C. In one embodiment, the resin may have no additional additives. The resin may include at least one of phenol, furan, epoxy, urethane, phenol-formaldehyde, polyester, vinyl ester, and urea aldehyde. The resin may include phenol-formaldehyde. The phenol-formaldehyde resin may include novolac or resole. Novolacs are phenol-formaldehyde resins with a formaldehyde to phenol molar ratio of less than 1, where the phenol units are mainly linked by methylene or ether groups, or both. The novolac polymer may have a molecular weight of from 1,000 to 100,000 grams per mole (g/mol), from 1,000 to 50,000 g/mol, from 1,000 to 25,000 g/mol, from 1,000 to 10,000 g/mol, from 1,000 to 5,000 g/mol, 5,000 to 100,000 g/mol, from 5,000 to 50,000 g/mol, from 5,000 to 25,000 g/mol, from 5,000 to 10,000 g/mol, 10,000 to 100,000 g/mol, from 10,000 to 50,000 g/mol, from 10,000 to 25,000 g/mol, from 25,000 to 50,000 g/mol, from 25,000 to 100,000 g/mol, or from 50,000 to 100,000 g/mol. The novolac polymer includes a glass transition temperature greater than 250° F., 300° F., 350° F., 390° F., 400° F., 450° F., or 500° F. Novolacs are stable, meaning that novolacs do not react and do retain their polymer properties at temperatures of up to 300° F., 400° F., 425° F., 450° F., 475° F., 500° F., 550° F., or 600° F. Resoles are phenol-formaldehyde resins with a formaldehyde to phenol molar ratio of more than 1, where the phenol units are mainly linked by methylene or ether groups, or both. This can harden without the addition of a crosslinking agent due to abundance of methylene to bridge the phenol groups. The resole may have a molecular weight of from 1,000 to 100,000 g/mol, from 1,000 to 50,000 g/mol, from 1,000 to 25,000 g/mol, from 1,000 to 10,000 g/mol, from 1,000 to 5,000 g/mol, 5,000 to 100,000 g/mol, from 5,000 to 50,000 g/mol, from 5,000 to 25,000 g/mol, from 5,000 to 10,000 g/mol, 10,000 to 100,000 g/mol, from 10,000 to 50,000 g/mol, from 10,000 to 25,000 g/mol, from 25,000 to 50,000 g/mol, from 25,000 to 100,000 g/mol, or from 50,000 to 100,000 g/mol. The resin coating may be coated on the proppant particles having a mesh size of 40/70, 30/50, 20/40, or combinations thereof. The resin coated proppants may be pumped at the tail end of the job for prevention of proppant flowback issues.

The resin coating may have a thickness of from 1 to 20 μm, from 1 to 15 μm, from 1 to 12 μm, from 1 to 10 μm, from 1 to 7 μm, from 1 to 5 μm, from 1 to 4 μm, from 1 to 3 μm, from 1 to 2 μm, from 2 to 20 μm, from 2 to 15 μm, from 2 to 12 μm, from 2 to 10 μm, from 2 to 7 μm, from 2 to 5 μm, from 2 to 4 μm, from 2 to 3 μm, from 3 to 20 μm, from 3 to 15 μm, from 3 to 12 μm, from 3 to 10 μm, from 3 to 7 μm, from 3 to 5 μm, from 3 to 4 μm, from 4 to 20 μm, from 4 to 15 μm, from 4 to 12 μm, from 4 to 10 μm, from 4 to 7 μm, from 4 to 5 μm, from 5 to 20 μm, from 5 to 15 μm, from 5 to 12 μm, from 5 to 10 μm, from 5 to 7 μm, from 7 to 20 μm, from 7 to 15 μm, from 7 to 12 μm, from 7 to 10 μm, from 10 to 20 μm, from 10 to 15 μm, from 10 to 12 μm, from 12 to 15 μm, or from 15 to 20 μm.

The fracturing fluid of the present disclosure may be characterized as a low viscosity fracturing fluid. The low viscosity fracturing fluid may have a viscosity of less than 80 centipoise (cp), less than 20 cp, less than 15 cp, less than 10 cp, less than 5 cp, from 1 cp to 10 cp, from 2 cp to 8 cp, from 3 cp to 7 cp, or any subset thereof.

The fracturing fluid may include an aqueous fluid. The aqueous fluid may be any suitable fluid containing, producing, resembling, or having the properties of water. The aqueous fluid may include fresh water, salt water, brine, municipal water, formation water, produced water, well water, filtered water, distilled water, sea water, or combinations thereof. The aqueous fluid in some embodiments may use water containing organic compounds or salt. Without being bound by any particular theory, salt or organic compounds may be incorporated into the aqueous fluid to control the density of the emulsified drilling fluid. Increasing the saturation of the aqueous fluid by increasing the salt concentration or the level of organic compounds in the aqueous fluid may increase the density of the drilling fluid. Suitable salts include but are not limited to alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides or combinations of these. In some particular embodiments, brine may be used in the aqueous fluid. Without being bound by any particular theory, brine may be used to create osmotic balance between the drilling fluid and the subsurface formation.

In embodiments, the fracturing fluid may include a slick water fracturing fluid. The slick water fracturing fluid includes an aqueous fluid and a friction reducer. The concentration of friction reducer in the slick water fracturing fluid may be from 0.25 to 2 gpt depending on the quality of water used for fracturing. The viscosity of the slick water fracturing fluid may be from 1 to 8 cp. The friction reducer may include long chain polyacrylamide based polymer (5-40 million Mwt.) that is added to water to reduce pumping friction in a turbulent flow regime. In embodiments, high viscosity friction reducers (HVFR) may be included. The HVFR may have a viscosity ranging from 5 to 80 cp. The HVFR may be present in the slick water fracturing fluid at a concentration of from 1 to 10 gpt. In some cases, these low viscosity fluids can also be used in conjunction with linear guar based fluids and crosslinked guar based fluid. These types of fracturing is called hybrid fracturing. In embodiments, the fracturing may initially be done with slick water fluid to create length of the fracture and later part of fracturing is switched to high viscosity linear or crosslinked fluid to deposit a larger quantity of proppants near the wellbore as low viscosity slickwater cannot carry larger and higher concentration of proppants. In embodiments, the fracturing fluid may be at least 10 wt. %, at least 20 wt. %, at least 30 wt. %, at least 40 wt. %, at least 50 wt. %, at least 60 wt. %, at least 70 wt. %, at least 80 wt. % water, at least 90 wt. % water, or at least 95 wt. % water.

The fracturing fluid may be a linear fluid, a gelled fluid, a crosslinked fluid, a slickwater fluid, a VES fluid, an energized or foam fluid, a $CO_2$ based super critical fluid, a nitrogen based fluid, a foam fluid, an oil based fluid, or an oil based foam fluid.

The fluid may include one or more buffers, crosslinkers, clay inhibitors, scale inhibitors, corrosion inhibitors, flowback enhancers, gelling agents, friction reducers, surfactants, iron control agents, biocides, demulsifiers, H2S scavengers, or gel stabilizers.

A fluid without proppant particles may be introduced into the formation. The fracturing fluid with the proppant particles and the fluid without the proppant particles are introduced in an alternating manner in some cases. The act of alternating fluids with and without proppant may be referred to as sweeping and the sweep-rate describes the amount of each fluid introduced before switching to the other fluid. For example, the sweep rate of fracturing fluid to fluid without proppant particles may be at least every 1,000 gallons, every 2,000 gallons, every 3,000 gallons, every 4,000 gallons or every 8,000 gallons. It should be understood that the fluid without the proppant particles and the fluid with the proppant particles may each be introduced as a fluid stage multiple times, such as 2, 4, 6, 8, 10, 20, 40, or more times. It should be understood that the fluid without proppants may be similar to the fracturing fluid in composition other than the lack of proppants.

In embodiments, the fracturing fluid may include a reactive fluid. The sweep rate of fracturing fluid vs reactive fluid may be every 1000 gallons, every 2000 gallons, every 3,000 gallons, every 4,000 gallons or every 8000 gallons, or any subset thereof. According to some embodiments, the reactive fluid may be the second fluid. The reactive fluid may be used in some cases where the reactive fluids is required to do some function. If the formation has any organic kerogen then reactive fracturing fluid containing oxidizers can be used in some sweeps. The reactive fluid may be added in the pad fluid so that it can interact with the kerogen and break down the kerogen. Similarly, if fracturing a tight carbonate reservoir and to increase the etching of micro and natural fractures to accept micro proppants the fracturing fluid containing acidizing agent such as HCl or in situ generated acid can be alternated. In some cases, reactive fluid can be mixed and pumped with the fracturing fluid for a portion of pumping to achieve the above objectives.

The reactive fluid may include fracturing fluid containing an acid such as a mineral acid or an organic acid. The mineral acid may include HCl. According to some embodiments, the reactive fluid may include plurality of proppants. According to alternate embodiments, the reactive fluid may not include any proppants. In some cases, pure HCl may be used.

The reactive fluid may have a pH from 0 to 5, from 0 to 4, from 0 to 3, from 0 to 2, from 0 to 1, from 1 to 5, from 1 to 4, from 1 to 3, from 1 to 2, from 2 to 5, from 2 to 4, from 2 to 3, from 3 to 5, from 3 to 4, from 4 to 5. The reactive fluid may include an aqueous fluid including oxidizer, enzyme, base, or combinations thereof.

The fracturing fluid may include an acid or a latent acid. As used herein, a "latent acid" refers to a molecule that becomes an acid under specified conditions. For example, latent acids may include esters, which break apart into acids when exposed to heat. Without being limited by theory, it is believed that latent acids may be preferable to acids because they are only acidic where acids are desired. They are believed not to not corrode the wellbore and are believed not be spent near the wellbore. Rather, it is believed that latent acids will be converted to acid in the far field, where the acid is needed. The acids or latent acids may be used to dissolve minerals (such as carbonates) or degradable particles within the fracture.

The fracturing fluid may have a pH of from −1 to 9, from −1 to 8, from −1 to 7, from −1 to 6, from −1 to 5, from −1 to 4, from −1 to 3, from −1 to 2, from −1 to 1, from 0 to 9, from 0 to 8, from 0 to 7, from 0 to 6, from 0 to 5, from 0 to 4, from 0 to 3, from 0 to 2, from 0 to 1, from 1 to 9, from 1 to 8, from 1 to 7, from 1 to 6, from 1 to 5, from 1 to 4, from 1 to 3, from 1 to 2, from 2 to 9, from 2 to 8, from 2 to 7, from 2 to 6, from 2 to 5, from 2 to 4, from 2 to 3, from 3 to 9, from 3 to 8, from 3 to 7, from 3 to 6, from 3 to 5, from 3 to 4, from 4 to 9, from 4 to 8, from 4 to 7, from 4 to 6, from 4 to 5, from 5 to 9, from 5 to 8, from 5 to 7, from 5 to 6, from 6 to 9, from 6 to 8, from 6 to 7, from 7 to 9, from 7 to 8, or from 8 to 9. It is contemplated that kerogen dissolving fracturing fluids may have pH from 3 to 9.

The fracturing fluid may include a latent acid in a concentration of from 1 to 50 ppg, from 1 to 40 ppg, from 1 to 30 ppg, from 1 to 20 ppg, from 1 to 10 ppg, from 10 to 50 ppg, from 10 to 40 ppg, from 10 to 30 ppg, from 10 to 20 ppg, from 20 to 50 ppg, from 20 to 40 ppg, from 20 to 30 ppg, from 30 to 50 ppg, from 30 to 40 ppg, or from 40 to 50 ppg.

According to some embodiments, the petroleum formation includes kerogen and the fracturing fluid includes a kerogen control additive. The kerogen control additive may include one or more of sodium bromate, potassium bromate, ammonium persulfate, or bromine.

The kerogen control additive may be present in the fracturing fluid at from 1 lb/1000 gallons of fracturing fluid to 50 lb/1000 gallons of fracturing fluid. For example, the kerogen control additive may be present in the fracturing fluid at from 1 lb/1000 gallons of fracturing fluid to 50 lb/1000 gallons of fracturing fluid, 1 lb/1000 gallons of fracturing fluid to 40 lb/1000 gallons of fracturing fluid, 1 lb/1000 gallons of fracturing fluid to 30 lb/1000 gallons of fracturing fluid, 1 lb/1000 gallons of fracturing fluid to 20 lb/1000 gallons of fracturing fluid, 10 lb/1000 gallons of fracturing fluid to 50 lb/1000 gallons of fracturing fluid, 20 lb/1000 gallons of fracturing fluid to 50 lb/1000 gallons of fracturing fluid, 30 lb/1000 gallons of fracturing fluid to 50 lb/1000 gallons of fracturing fluid, or any subset thereof. According to some embodiments, both the kerogen control additive and the acid or latent acid may be present in the fracturing fluid.

EXAMPLES

Example 1

A first solution was prepared by combining 250 ml of water with 0.25 ml of aeroamine 3030C from CYTEC cationic surfactant and 0.5 ml of a second solution. The second solution included 20 vol. % of WACKER AF 23 (a poly[3-((2-aminoethyl)amino)propyl]methyl (dimethyl)siloxane, hydroxyterminated from Wacker) and 80 vol. % of dipropylene glycol monobutyl ether. The first and second solutions were combined to form a combined solution. These solutions form the hydrophobic coating for the proppant. The combined solution was combined with 100 g of 20/40 mesh sand in a laboratory blender to form a slurry. The slurry was blended for 1 min. at from 200 to 800 rpm, entraining gas bubbles. Gas was visibly trapped in the slurry and after 30 min. the sand had not settled to the bottom of the container. The agglomerated particles formed a loose pack which floated in the water phase. This example showed that the hydrophobic coating on the proppant with air can make the particle float in the aqueous phase.

Example 2

100 g of 20/40 sand was combined with 300 ml of slick water. The slick water included water and 2 gallons per thousand gallons (gpt) of anionic friction reducer (available as MaxPerm from Baker Hughes). Then, 3 ml of a hydrophobic proppant coating solution available as Flopaam from SNF was added to the combined sand and slick water forming a mixture. The hydrophobic proppant coating solution included 60% poly(isobutylene), 0.5% stearylamine, and 39.5% 2-ethylhexanol/n-hexanol (1:1 ratio). The mixture was blended at from 200 to 800 rpm for 1 min to entrain air in the sample. It was immediately observed that 70 wt. % of the coated proppants floated on the top. This shows that air bubbles attached to the hydrophobically coated sand and made them buoyant.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of the present disclosure, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method of stimulating petroleum production comprising:
   introducing a fracturing fluid into a petroleum formation, thereby creating at least one fracture to stimulate petroleum production, wherein:
      the fracturing fluid comprises a foam that includes foam from 30 volume percent (vol. %) to 90 vol. % gas;
      the fracturing fluid is introduced into the petroleum formation at a pressure above the breakdown pressure of the petroleum formation;
      the fracturing fluid comprises a plurality of coated proppants each comprising a proppant particle and a coating;
      the coating comprises a hydrophobic coating, a cross-linked hydrogel, or both;
      from 1 to 50 wt. % of the plurality of proppants comprises micro proppants having a particle size ranging from 0.5 to 150 μm; and
      from 50 to 99 wt. % of the plurality of proppants comprises macro proppants having a particle size of 100 mesh and greater.

2. The method of claim 1, wherein the hydrophobic coating comprises one or more organosilanes, organosiloxanes, fluoro-organosilanes, fluoro-organosiloxanes, polysiloxanes, organo fluorocarbons, organo perfluorocarbons, long chain hydrocarbons, polyolefins, polyesters, acrylic polymers, or vinyl polymers.

3. The method of claim 1, wherein the coating consists of the cross-linked hydrogel.

4. The method of claim 1, wherein the fracturing fluid further comprises a plurality of degradable particles.

5. The method of claim 1, wherein the coating is at least 1 wt. % of the total weight of proppant particles and coating.

6. The method of claim 1, wherein the coating has an average thickness of at least 1 μm.

7. The method of claim 1, wherein from 10 wt. % to 50 wt. % of the plurality of proppants comprises micro proppants having a particle size ranging from 0.5 to 150 μm.

8. The method of claim 1, wherein at least from 30 wt. % to 50 wt. % of the plurality of proppants comprises micro proppants having a particle size ranging from 0.5 to 150 μm.

9. The method of claim 1, wherein the coating is applied before introducing the plurality of proppant particles to the rest of the fracturing fluid.

10. The method of claim 1, wherein:
    a first volume of the fracturing fluid is introduced, wherein the first volume is from 5 to 15 vol. % of the fracturing fluid and the first volume comprises proppants from 0.5 μm to 100 μm in diameter, at least 80 wt. % of the proppants in the first volume are less than 50.0 μm in diameter;
    then a second volume of the fracturing fluid is introduced, wherein the second volume is from 5 to 70 vol. % of the fracturing fluid and the second volume comprises proppants 0.5 μm to 150 μm in 1-50 wt. % ratio and 50 to 99 wt. % proppants with diameters from 105 μm to 250 μm in diameter; and
    then a final volume of the fracturing fluid is introduced, wherein the final volume is 10 to 30 vol. % of the fracturing fluid and the final volume comprises proppants larger than 250 μm in diameter, and at least 80 wt. % of the proppants in the final volume are larger than 250 μm in diameter.

11. The method of claim 1, wherein:
at least 20 wt. % of the plurality of micro proppants have a diameter less than 20 μm;
at least 50 wt. % of the plurality of micro proppants have a diameter less than 50 μm; and
at least 90 wt. % of the plurality of micro proppants have a diameter less than 100 μm.

12. The method of claim 1, wherein the fracturing fluid is aqueous.

13. The method of claim 1, wherein the fracturing fluid comprises a linear fluid, gelled fluid, crosslinked fluid, slickwater fluid, VES fluid, energized or foam fluid, or combinations thereof.

14. The method of claim 1, wherein the fracturing fluid comprises a $CO_2$ based super critical fluid, nitrogen based fluid, foam fluid, oil based fluid, oil based foam fluid, or combinations thereof.

15. The method of claim 1, wherein the gas comprises air, nitrogen, carbon dioxide, or combinations thereof.

16. The method of claim 1, wherein the plurality of proppants with diameters from 0.5 μm to 150 μm are present in the micro fracturing fluid at a concentration of from 0.25 pounds per gallon (ppg) to 30 ppg.

17. The method of claim 1:
further comprising introducing gas into the petroleum formation with the fracturing fluid; and
wherein the coating comprises the hydrophobic coating.

18. A method of stimulating petroleum production comprising:
introducing a fracturing fluid into a petroleum formation, thereby creating at least one fracture to stimulate petroleum production, wherein:
the fracturing fluid comprises a foam that includes foam from 30 volume percent (vol. %) to 90 vol. % gas;
the fracturing fluid is introduced into the petroleum formation at a pressure above the breakdown pressure of the petroleum formation;
the fracturing fluid comprises a plurality of proppants each comprising a proppant particle;
from 1 to 50 wt. % of the plurality of proppants comprises micro proppants having a particle size ranging from 0.5 to 150 μm; and
from 50 to 99 wt. % of the plurality of proppants comprises macro proppants having a particle size of 100 mesh and greater; and
coating the proppant particles with a hydrophobic coating in situ by adding a hydrophobic coating agent to the fracturing fluid such that the concentration of the hydrophobic coating agent is from 0.25 to 3 gpt of the fluid, wherein the fracturing fluid comprises a plurality of coated proppants each comprising a proppant particle and a coating and the coating comprises a hydrophobic coating, a cross-linked hydrogel, or both.

* * * * *